(12) United States Patent
Diedrich et al.

(10) Patent No.: US 7,290,252 B2
(45) Date of Patent: Oct. 30, 2007

(54) METHOD AND APPARATUS FOR BUILDING EXECUTABLE COMPUTER PROGRAMS USING COMPILED PROGRAM LIBRARIES

(75) Inventors: Richard Alan Diedrich, Rochester, MN (US); Richard Allen Saltness, Rochester, MN (US); John Matthew Santosuosso, Rochester, MN (US)

(73) Assignee: International Business Machines Corporaiton, Armonk, NY (US)

( * ) Notice: Subject to any disclaimer, the term of this patent is extended or adjusted under 35 U.S.C. 154(b) by 712 days.

(21) Appl. No.: 10/418,599

(22) Filed: Apr. 17, 2003

(65) Prior Publication Data

US 2004/0210883 A1 Oct. 21, 2004

(51) Int. Cl.
*G06F 9/44* (2006.01)
*G06F 9/45* (2006.01)
(52) U.S. Cl. .................. 717/145; 717/162; 717/163; 717/164
(58) Field of Classification Search ........ 717/162–167, 717/120–122, 145
See application file for complete search history.

(56) References Cited

U.S. PATENT DOCUMENTS

| 5,805,899 A * | 9/1998 | Evans et al. ............... 395/712 |
| 5,956,513 A * | 9/1999 | McLain, Jr. ............... 395/705 |
| 6,931,626 B2 * | 8/2005 | Sheedy ..................... 717/122 |

* cited by examiner

*Primary Examiner*—Meng-Al T An
*Assistant Examiner*—Insun Kang
(74) *Attorney, Agent, or Firm*—Roy W. Truelson

(57) ABSTRACT

A program which is linked or bound by reference (referenced program) into one or more other programs supports multiple valid export signatures, each corresponding to a respective version of the referenced program. When a program is built, it records the current signature of each referenced program it is bound to. When subsequently determining whether to rebuild the program, the previously recorded signature of any referenced program is compared with all currently supported signatures of the referenced program, and only if none of the supported signatures matches does the program need to be re-built to ensure compatibility with the referenced program. Preferably, the referenced program is a program library containing supporting procedures, intended to be used by multiple applications programs which are bound to it.

12 Claims, 8 Drawing Sheets

PGM1
- Components: Obj 1A (Src 1A)
  - Obj 1B (Src 1B)
  - Obj 1C (Src 1C)
- References: Svc Pgm 4
  - Svc Pgm 5

⋮

PGM2
- Components: Obj 2A (Src 2A)
  - Obj 2B (Src 2B)
  - Obj 2C (Src 2C)
- References: Svc Pgm 4
  - Svc Pgm 5

⋮

PGM 3

⋮

SVC PGM 4
- Components: Obj 4A (Src 4A)
  - Obj 4B (Src 4B)
  - Obj 4C (Src 4C)

⋮

SVC PGM 5

METHOD AND APPARATUS FOR BUILDING EXECUTABLE COMPUTER PROGRAMS USING COMPILED PROGRAM LIBRARIES

FIELD OF THE INVENTION

The present invention relates to digital data processing, and in particular to methods and apparatus for generating executable computer code by building, linking, compiling, and/or similar techniques.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises one or more central processing units (CPU) and supporting hardware necessary to store, retrieve and transfer information, such as communication buses and memory. It also includes hardware necessary to communicate with the outside world, such as input/output controllers or storage controllers, and devices attached thereto such as keyboards, monitors, tape drives, disk drives, communication lines coupled to a network, etc. The CPU or CPUs are the heart of the system. They execute the instructions which comprise a computer program and directs the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Sophisticated software at multiple levels directs a computer to perform massive numbers of these simple operations, enabling the computer to perform complex tasks. What is perceived by the user as a new or improved capability of a computer system is made possible by performing essentially the same set of very simple operations, but using software having enhanced function, along with faster hardware.

In the very early history of the digital computer, computer programs which instructed the computer to perform some task were written in a form directly executable by the computer's processor. Such programs were very difficult for a human to write, understand and maintain, even when performing relatively simple tasks. As the number and complexity of such programs grew, this method became clearly unworkable. As a result, alternate forms of creating and executing computer software were developed.

Two developments in particular have been the use of a software hierarchy of multiple levels, and the use of high-level languages, particularly for user application programs. A software hierarchy models different levels of software according to the closeness to the actual hardware. At a low level, an operating system kernel typically performs such functions as the management of memory pages, management of multiple processor tasks, I/O and storage device interfaces, interrupt handling, and so forth. At a next level, operating system extensions and utilities might provide callable functions to user applications for application run time support, database management, storage allocation, program compilation, and so forth. At a still higher level, user applications perform work defined by a user, calling lower level routines as necessary. It will be understood that the concept of software hierarchy is very general, and the number of levels and division of function varies considerably from one computer system to another.

High-level languages vary in their characteristics, but all such languages are intended to make it easier for a human to write a program to perform some task. Typically, high-level languages represent instructions, fixed values, variables, and other constructs in a manner readily understandable to the human programmer rather than the computer. Such programs are not directly executable by the computer's processor. In order to run on the computer, the programs must first be transformed into a form that the processor can execute.

Transforming a high-level language program into executable form requires that the human-readable program form (source code) be converted to a processor-executable form (object code) in a compilation process. For very simple programs, the entire program is potentially compilable as a single unit. However, as programs have grown in complexity, and frequently call or invoke functions and procedures which are parts of other programs, it is often impractical to compile the program as a single unit. In a typical case, individual modules or parts of a program are separately compiled, and a further process, sometimes referred to herein as a build process, gathers the different parts and places references in each part to other parts as required, so that the parts may execute together as a single program.

As programs have grown in sophistication, it is known to employ program libraries of commonly used procedures. A program library is not intended to function as a stand-alone program, but is instead a collection of executable procedures or functions which may be used by other programs. Often, a program library has some common theme to the procedures contained therein for supporting applications of a certain family, such as an accounting library, a database library, a graphics library, and so forth. It is usually intended that such libraries be incorporated into many different applications by linking or binding to the application program, although it is not necessarily true that each application program will use all of the procedures in the library. The program library may contain many separately compiled individual modules.

Code modules and program libraries undergo frequent updates, which are not necessarily synchronized.. When a large program is to be built from many separately compilable modules, a build tool typically verifies that the object module components are current. Conventionally, this is done by comparing timestamps of the various component parts with those of sub-components or source modules.

In the case of a program included by a referential technique, such as a program library, which is typically a collection of separately compiled modules, a conventional build process will compare the timestamp of the referenced program with that of the program which refers to it (is linked or bound to it). If the timestamp of the current referenced program is later, it is assumed that the program which refers to it is no longer current and must be re-built.

However, in many cases, the changes to a program library or other such referenced program would not necessarily require rebuilding all the programs which use it. For example, a program library may have been rebuilt (has a later date/timestamp) only because some new procedure was added, and the original procedures remain untouched. In these cases, it is possible for the program library to support multiple different versions for binding purposes, one of which corresponds to the most current build, while others are at a back level.

Thus, although not necessarily recognized, a certain amount of unnecessary rebuilding may occur when a build utility uses timestamps to determine which objects must be rebuilt, particularly where a build utility determines that a program must be rebuilt if any program library it is bound to has a later date/timestamp. An unrecognized need exists for a more intelligent method of determining whether to rebuild a program.

SUMMARY OF THE INVENTION

A program which is linked or bound by reference (referenced program) into one or more other programs supports multiple valid export signatures, each corresponding to a respective version of the referenced program. When a program is built, it records the current signature of each referenced program it is bound to. When a determination is subsequently made whether the program needs to be rebuilt, the signature of any referenced program recorded at build time is compared with all currently supported signatures of the referenced program, and only if none of the supported signatures matches the previously recorded signature does the program need to be re-built to ensure compatibility with the referenced program.

A signature is anything that might uniquely identify a version of the referenced program. In the preferred embodiment, the signature is a hash function of the referenced program's externally accessible procedure names, it being understood that other signatures, such as combinations of referenced program name, timestamp, version number, and so forth, might also be used.

In the preferred embodiment, the referenced program is a program library (such as a service program or dynamic link library) contained supporting procedures, intended to be used by multiple applications programs which are bound to it.

By more selectively and intelligently determining whether to rebuild a program, the amount of required rebuilding is reduced. In some environments involving large, complex applications, this can significant reduce the time required to build.

The details of the present invention, both as to its structure and operation, can best be understood in reference to the accompanying drawings, in which like reference numerals refer to like parts, and in which:

BRIEF DESCRIPTION OF THE DRAWING

FIG. 5 is a conceptual illustration showing in greater detail the structure of a make file, according to the preferred embodiment.

DETAILED DESCRIPTION OF THE PREFERRED EMBODIMENT

Figure 1:
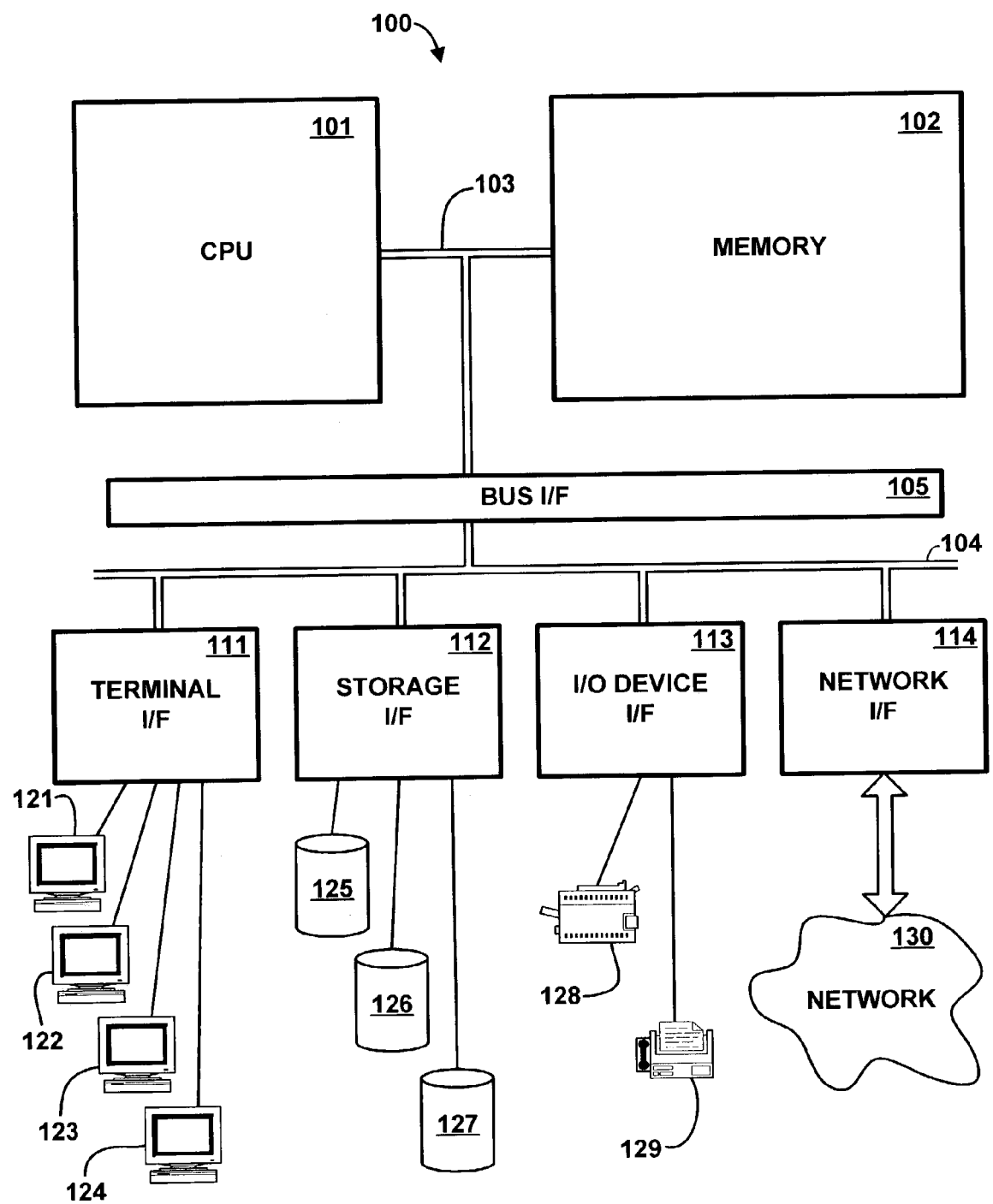
FIG. 1 is a high-level block diagram of the major hardware components of a computer system for building computer programs using compiled program libraries, according to the preferred embodiment of the present invention.

Referring to the Drawing, wherein like numbers denote like parts throughout the several views, FIG. 1 is a high-level representation of the major hardware components of a computer system 100 utilizing an automated build utility for building computer programs, according to the preferred embodiment of the present invention. CPU 101 is a general-purpose programmable processor which executes instructions and processes data from main memory 102. Main memory 102 is preferably a random access memory using any of various memory technologies, in which data is loaded from storage or otherwise for processing by CPU 101.

Memory bus 103 provides a data communication path for transferring data among CPU 101, main memory 102 and I/O bus interface unit 105. I/O bus interface 105 is further coupled to system I/O bus 104 for transferring data to and from various I/O units. I/O bus interface 105 communicates with multiple I/O interface units 111-114, which may also be known as I/O processors (IOPs) or I/O adapters (IOAs), through system I/O bus 104. System I/O bus may be, e.g., an industry standard PCI bus, or any other appropriate bus technology. The I/O interface units support communication with a variety of storage and I/O devices. For example, terminal interface unit 111 supports the attachment of one or more user terminals 121-124. Storage interface unit 112 supports the attachment of one or more direct access storage devices (DASD) 125-127 (which are typically rotating magnetic disk drive storage devices, although they could alternatively be other devices, including arrays of disk drives configured to appear as a single large storage device to a host). I/O device interface unit 113 supports the attachment of any of various other types of I/O devices, such as printer 128 and fax machine 129, it being understood that other or additional types of I/O devices could be used. Network interface 114 supports a connection to an external network 130 for communication with one or more other digital devices. Network 130 may be any of various local or wide area networks known in the art. For example, network 130 may be an Ethernet local area network, or it may be the Internet. Additionally, network interface 114 might support connection to multiple networks.

It should be understood that FIG. 1 is intended to depict the representative major components of system 100 at a high level, that individual components may have greater complexity that represented in FIG. 1, that components other than or in addition to those shown in FIG. 1 may be present, and that the number, type and configuration of such components may vary, and that a large computer system will typically have more components than represented in FIG. 1. Several particular examples of such additional complexity or additional variations are disclosed herein, it being understood that these are by way of example only and are not necessarily the only such variations.

Although only a single CPU 101 is shown for illustrative purposes in FIG. 1, computer system 100 may contain multiple CPUs, as is known in the art. Although main memory 102 is shown in FIG. 1 as a single monolithic entity, memory 102 may in fact be distributed and/or hierarchical, as is known in the art. E.g., memory may exist in multiple levels of caches, and these caches may be further divided by function, so that one cache holds instructions while another holds non-instruction data which is used by the processor or processors. Memory may further be distributed and associated with different CPUs or sets of CPUs, as is known in any of various so-called non-uniform memory access (NUMA) computer architectures. Although memory bus 103 is shown in FIG. 1 as a relatively simple, single bus structure providing a direct communication path among CPU 101, main memory 102 and I/O bus interface 105, in fact memory bus 103 may comprise multiple different buses or communication paths, which may be arranged in any of various forms, such as point-to-point links in hierarchical, star or web configurations, multiple hierarchical buses, parallel and redundant paths, etc. Furthermore, while I/O bus interface 105 and I/O bus 104 are shown as single respective units, system 100 may in fact contain multiple I/O bus interface units 105 and/or multiple I/O buses 104. While multiple I/O interface units are shown which separate a system I/O bus 104 from various communications paths running to the various I/O devices, it would alternatively be possible to connect some or all of the I/O devices directly to one or more system I/O buses.

Computer system 100 depicted in FIG. 1 has multiple attached terminals 121-124, such as might be typical of a multi-user "mainframe" computer system. Typically, in such a case the actual number of attached devices is greater than those shown in FIG. 1, although the present invention is not limited to systems of any particular size. User workstations or terminals which access computer system 100 might also be attached to and communicated with system 100 over network 130. Computer system 100 may alternatively be a single-user system, typically containing only a single user display and keyboard input.

While various system components have been described and shown at a high level, it should be understood that a typical computer system contains many other components not shown, which are not essential to an understanding of the present invention. In the preferred embodiment, computer system 100 is a computer system based on the IBM AS/400™ or i/Series™ architecture, it being understood that the present invention could be implemented on other computer systems.

Figure 2:
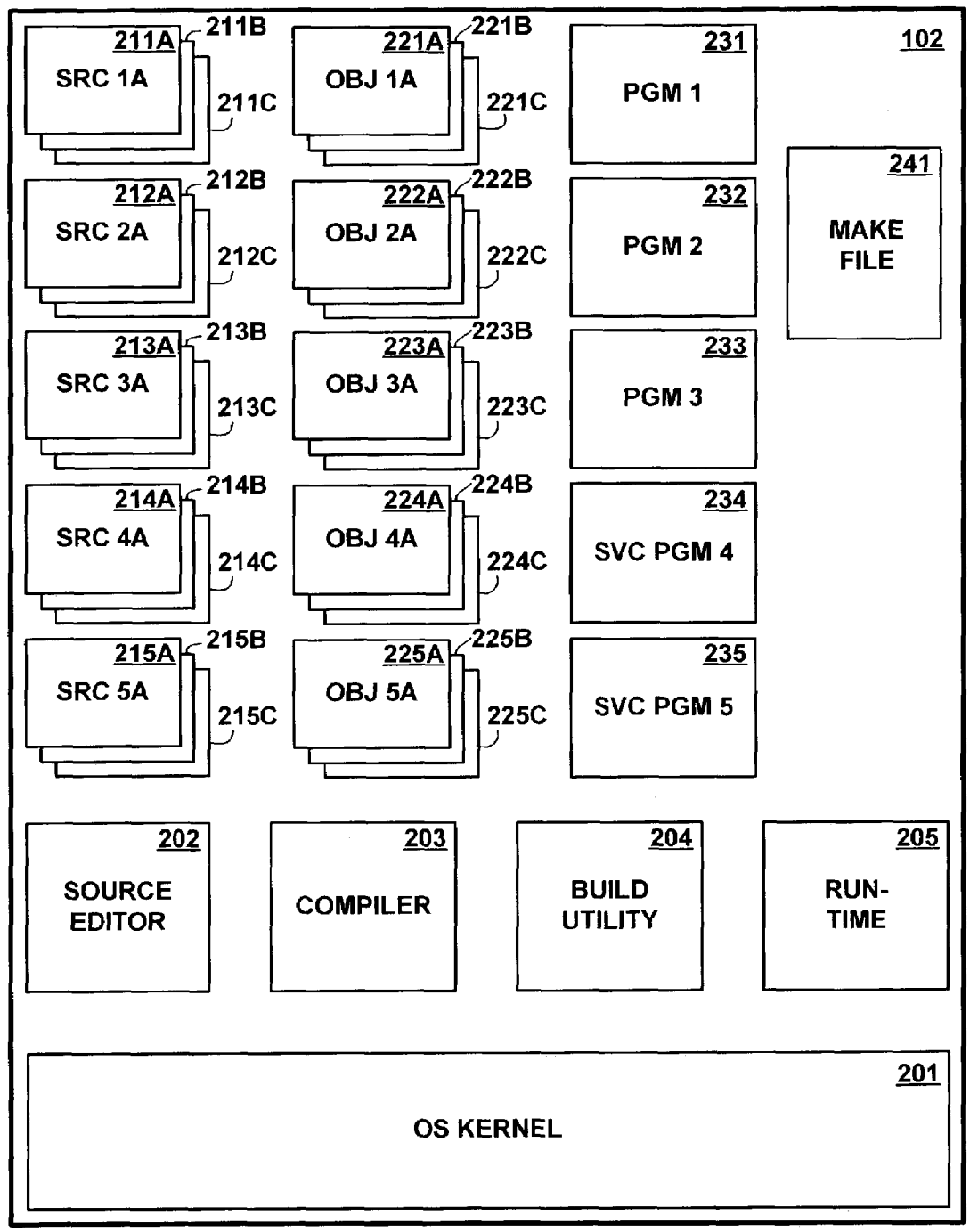
FIG. 2 is a conceptual illustration of the major software components of a computer system for building computer programs, according to the preferred embodiment.

FIG. 2 is a conceptual illustration of the major software components of system 100 in memory 102. Operating system kernel 201 provides various low-level software functions, such as device interfaces, management of memory pages, management and dispatching of multiple tasks, and so forth, as is well-known in the art. Source editor 202 is an executable computer program which supports the creation and editing of source code for other computer programs, using any of various known techniques. Source editor 202 may be a general-purpose text editor which is non-specific to a programming language, or may a special-purpose source editor for a particular language having built-in syntax checking or other features. Compiler 203 is an executable computer program which compiles source modules in a particular computer language into object code modules of executable statements. Build utility 204 is an executable computer program which builds applications by incorporating or binding multiple object code modules and programs, as explained in greater detail herein. Run-time support module 205 is low-level executable program code which provides necessary functions enabling a program built by build utility 204 to execute on system 100. Although source editor 202, compiler 203, build utility 204 and run-time support module 205 are shown as separate entities in FIG. 2, it will be understood that these are often packaged together as part of an integrated application development environment. Furthermore, it will be appreciated that some or all of these functions, and in particular run-time support, are often incorporated into an operating system. Additionally, although functional modules 202-205 are depicted in FIG. 2 on a single computer system 100 for completeness of the representation, it is not necessarily true that all functions will be present on a single computer system or will be performed on a single computer system. For example, editing of source code may be performed by source editors located in a distributed manner in individual workstations, while compiling and building of code might be performed by a centralized server.

Also shown in FIG. 2 are multiple source code modules 211A-C, 212A-C, 213A-C, 214A-C, 215A-C, and corresponding object code modules 221A-C, 222A-C, 223A-C, 224A-C, 225A-C. Each respective object code module is a compiled version of a corresponding source code module generated by compiler 203. For example, object code module 221A is a compiled version of source code module 211A.

Application programs 231-233 are executable programs which are built by build utility 204 from object code modules, and bound to service programs 234-5. Specifically, in a complex programming development environment, a program is typically divided into multiple modules for source maintenance and compilation purposes. In the illustration of FIG. 2, source modules 211A-C are compiled to object modules 221A-C, which are ultimately included in executable application program 231 (and similarly, source modules 212A-C compile to object modules 222A-C, which are included in program 232; and source modules 213A-C compile to object modules 223A-C, which are included in program 233). The build utility incorporates multiple object modules into a single application program as part of a build process.

Memory 102 further includes multiple program libraries, which in this environment are called "service programs" 234-235. Service programs are not intended for stand-alone execution, but instead contain a collection of executable procedures for use by other programs, such as application programs 231-233. Each service program 234-235 has an external interface for calling the procedures contained therein. When an application program is built, the build utility binds the application program to any required service programs. Like application programs, service programs 234-235 are built by build utility 204 from object code modules. In the illustration of FIG. 2, source modules 214A-C are compiled to object modules 224A-C, which are ultimately included in service program 234 (and similarly, source modules 215A-C compile to object modules 225A-C, which are included in service program 235).

It will be understood that a program library, consistent with the present invention, need not be a service program within the IBM i/Series architecture, but could be any equivalent program or structure which contains procedures for use by other programs, however named. Most programming environments supports some form of program library construct. For example, a so-called "dynamic link library" in the Microsoft™ Windows™ environment is a form of program library.

Memory 102 further includes make file 241. Make file is a form of source file for the build utility. It contains a list of all components and dependencies of an application which should be built together, i.e., all application programs and service programs included in an application, as more fully described herein.

Although a certain number of source modules, object modules, application programs and service programs are shown in the conceptual representation of FIG. 2, it will be understood that the actual number of such entities may vary, and in particular, that in a complex program development environment, the number of such entities is typically much larger. Furthermore, it will be understood that various entities could be stored in a distributed fashion on multiple computer systems.

While the software components of FIG. 2 are shown conceptually as residing in memory 102, it will be understood that in general the memory of a computer system will be too small to hold all programs and other data simultaneously, and that information is typically stored in data storage devices 125-127, comprising one or more mass storage devices such as rotating magnetic disk drives, and that the information is paged into memory by the operating system as required.

Figure 3:
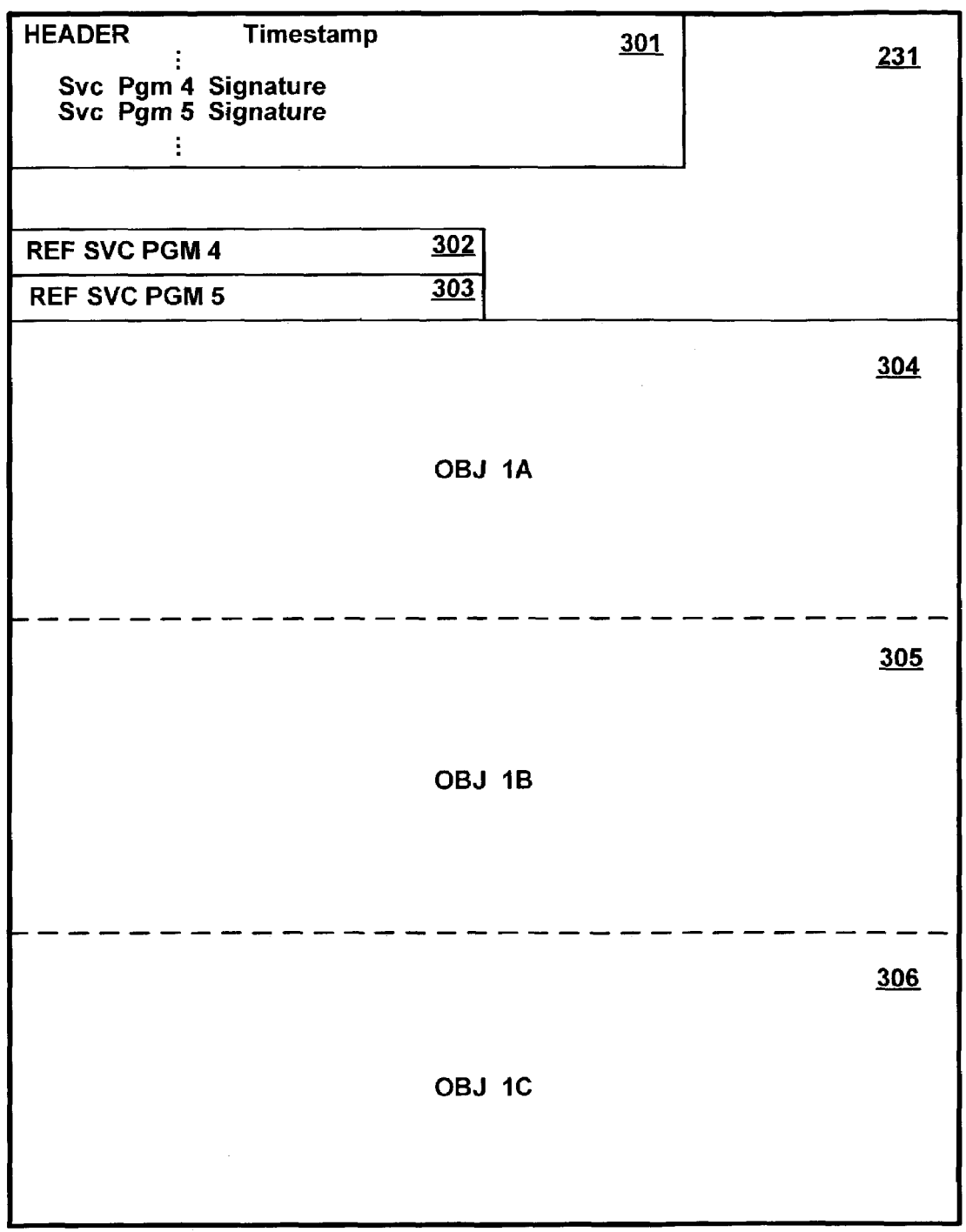
FIG. 3 is a conceptual illustration showing in greater detail the structure of an executable application program, according to the preferred embodiment.

FIG. 3 is a conceptual illustration showing in greater detail a generalized structure of a representative executable application program 231, according to the preferred embodiment. As shown, application program 231 includes a header 301, references to service programs 302, 303, and incorporated object code 304-306. In this example, application program 231 is built by incorporating object modules 221A-221C in a single application program file. I.e., the actual object code (executable instructions) contained in object modules 221A-221C is incorporated into application program file 231 as incorporated object code 304-306, respectively, and so these object modules may be said to be linked or bound "by copy". It will be understood that an incorporate object code section 304 is not necessarily an exact copy of a corresponding object module 221A, since some address references may be resolved in the build process. Additionally, some form of reference 302, 303 is made to each respective service program 234, 235 having procedures which are used by the application program, and the service programs are therefore said to be linked or bound "by reference". Linking or binding by reference means that the actual object code instructions which form the service program are not included in the application program file, but some form of reference or linking mechanism will be present which enables the service program routines to be called from the application program. The exact form of the reference mechanism will vary with the programming environment. In the conceptual illustration of FIG. 2, reference mechanisms 302, 303 are shown separately from included object code portions 304-306; however, in some environments the references to the service programs may be wholly or partially incorporated into the included object code themselves, as by directly fixing reference addresses in the object code of the application program.

Header 301 may include a variety of information necessary to identify the application program, facilitate build or execution, record change history, and so forth. In particular, header 301 includes a timestamp indicating when application program 231 was built, and a list of any included service programs and their corresponding "signatures". A signature is anything that might uniquely identify a particular version (or set of versions) of a service program. In the preferred embodiment, the signature is a hash function of the service program's externally accessible procedure names, sufficiently long so that accidental duplication is mathematically extremely unlikely. It will be understood that alternative forms of signature could be used to uniquely identify a service program and version, such as combinations of service program name, timestamp, version number, virtual address in a permanent address space, and so forth, might also be used.

Figure 4:
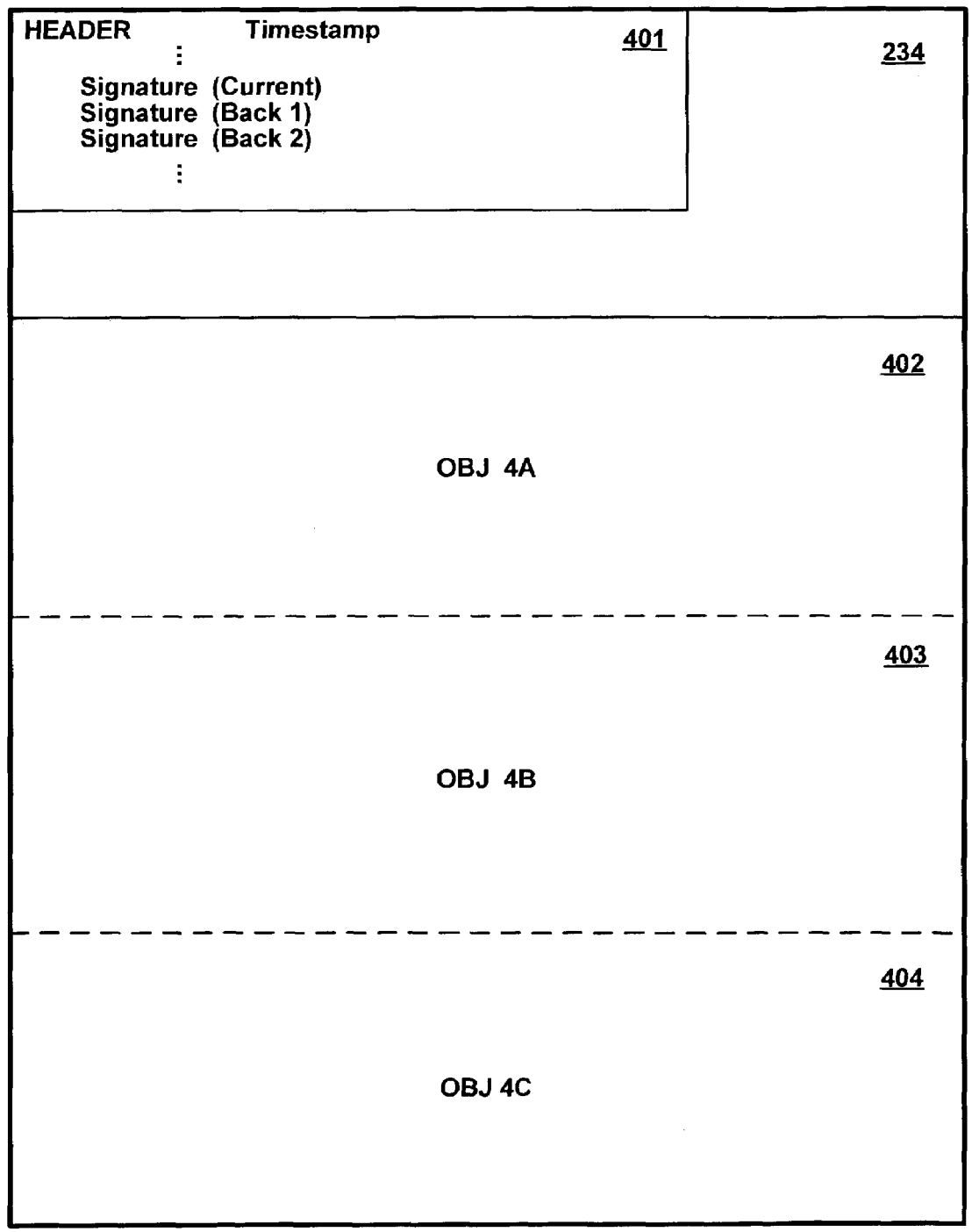
FIG. 4 is a conceptual illustration showing in greater detail the structure of a service program, according to the preferred embodiment.

FIG. 4 is a conceptual illustration showing in greater detail a generalized structure of a representative service program 234, according to the preferred embodiment. As shown, service program 234 includes a header 401, and incorporated object code 402-404. In this example, service program 234 is built by incorporating object modules 224A-224C in a single service program file. I.e., similarly to the case of application program 231, object code contained in modules 224A-224C is incorporated into service program file 234 as incorporated object code 402-404, respectively, and so these object modules may be said to be linked or bound "by copy".

Header 401 may include a variety of information necessary to identify the service program, facilitate build or execution, record change history, and so forth. In particular, header 401 includes a timestamp indicating when service program 234 was built. Header 401 further contains a list of all valid (supported) signatures of program 234. The current signature (i.e., the signature of the service program from the most recent build) is one of the supported signatures. However, there may be one or more additional supported signatures from previously built versions of service program 234, indicated in FIG. 4 as "signature (back1)" and "signature (back2)".

A supported signature for a back level version of the service program is a signature of a such a version, where the version of the service program is externally compatible with the current version, such that an application program which was originally built referencing the back level version will execute normally using the current version of the service program. A service program may undergo any of various types of changes and updates, only some of which result in external incompatibility. The types of changes which cause incompatibility may vary with the programming environment. For example, if the number or length of passed parameters in a procedure call into the service program changes, this will almost always cause an incompatibility, and it will be necessary to rebuild any application programs which reference the service program. If, on the other hand, a new procedure is added to the service program (which is not used by application programs referencing the older versions of the service program), it might not be necessary to rebuild the application program, since a previously built program will simply not call the new procedure; in this case, a back level signature might continue to be supported, although whether this particular situation would result in an incompatibility may depend on the programming environment. In a further example, if a service program modifies a shared data structure having reserved fields for future use, and the service program is updated to initialize a reserved field (without altering the size of the field) so that it may be used for some purpose, then this type of change to the service program would almost never cause an incompatibility, since any older versions of application programs would simply never use the newly initialized reserved field. It will be appreciated that many additional examples could be constructed, and that there are a large number of situations in which an update to a service program does not necessarily cause incompatibility with all the previously built application programs which reference the service program.

FIG. 5 is a conceptual illustration showing in greater detail a generalized structure of make file 241, according to the preferred embodiment. Make file 241 is essentially a list of all the component parts of an "application", i.e. of a set of related executable application programs and the service programs they call. Although each application program of the set may be independently executable, it is often desirable to build a set of related application programs at the same time to ensure compatibility and uniformity. For example, the programs of a set may reference a common database, for which reason uniformity is desirable. Such a set of application programs may be marketed together as a package, or intended for internal use by the a group of users.

In the example of FIG. 5, the application comprises application programs 231-233 and service programs 234-235. Make file 241 acts as a template which instructs build utility 204 how to build the application, as explained in greater detail herein. A make file is typically generated manually by a programmer using a suitable editor. While multiple application programs are shown in the make file of FIG. 5, enabling all the constituent programs to be built at the same time, it would alternatively or additionally be possible to have separate make files for each application program 231-233, so that each program could be separately built.

As shown in FIG. 5, make file 241 contains a list of all the constituent application programs (PGM1, PGM2, PGM3), and, for each program, the object module components of the program and the service programs which are references by the application program. For example, PGM1 (shown in FIG. 2 as feature 231) contains object module components Obj1A 221A, Obj1B 221B and Obj1C 221C, which are constructed from Src1A 211A, Src1B 211B, and Src1C 211C, respectively. PGM1 also references SvcPgm4 234 and SvcPgm5 235. Make file 241 additionally contains a list of all the service programs and, for each such service program, the object module components of the service program. For example, SvcPgm4 234 contains object module components Obj4A 224A, Obj4B 224B and Obj4C 224C, which are constructed from Src4A 214A, Src4B 214B, and Src4C 214C, respectively.

In accordance with the preferred embodiment of the present invention, the service program may contains multiple supported signatures of itself for export, each corresponding to a respective version of the service program which is externally compatible with the current version. When build utility program 204 is invoked to build an application, it compares the signature of the referenced service program in the application program's header (which was recorded when the application program was built) with all supported signatures of the corresponding service program. If any of the signatures matches, then rebuild of the application program is not required to ensure compatibility with the service program (although it may be required for other reasons). The build process is explained in greater detail below and illustrated in FIGS. 6 and 7.

Figure 6:
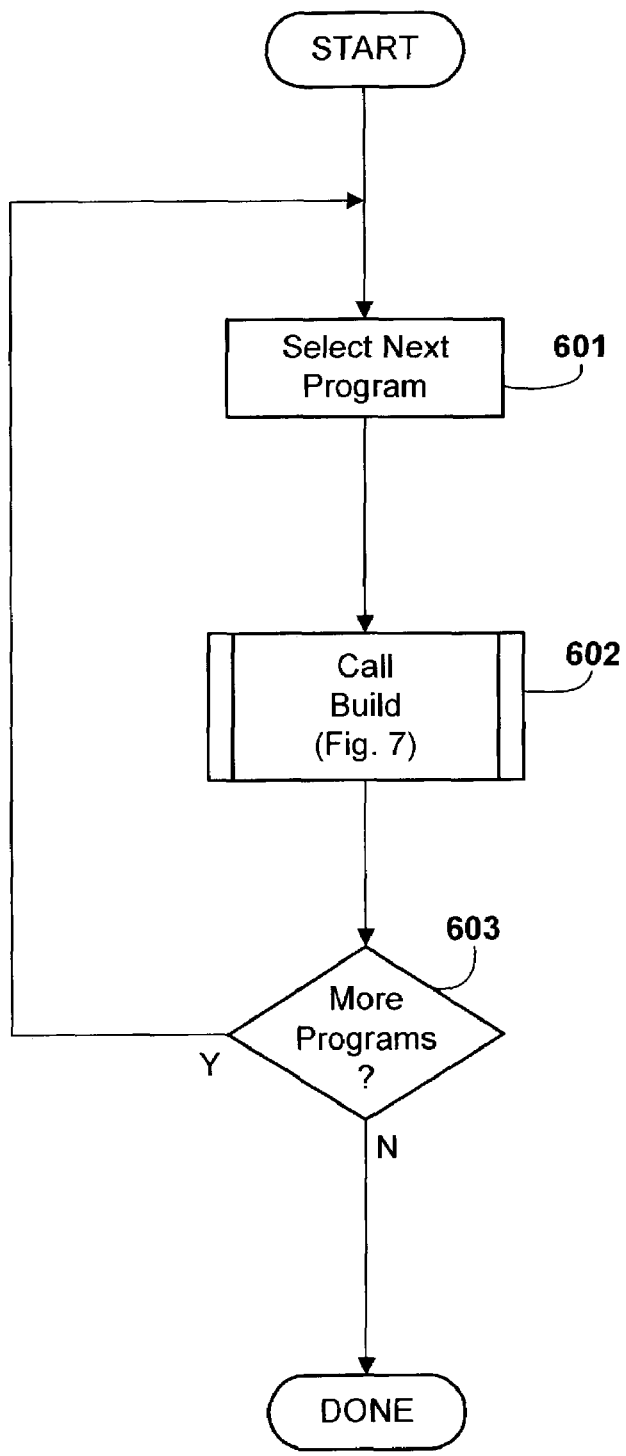
FIG. 6 is a high-level flow diagram showing the process of building an application, according to the preferred embodiment.

FIG. 6 is a high-level flow diagram showing the process of building an application in build utility program 204 using make file 241. Referring to FIG. 6, the build utility parses the entries in make file 241, and in turn selects the next program entry (which could be a service program or an application program) in the make file (step 601). The build utility then calls a recursive Build procedure to perform any necessary build tasks with respect to the entry (represented in FIG. 6 as step 602, and described in greater detail with respect to FIG. 7). As described below, it may be that the build utility will determine that no compilation or build activity with respect to the program entry is required. If there are additional entries in the make file (step 603), the build utility returns to step 601 to select the next entry. When all entries are processed, the "N" branch is taken from step 603 and the building of the application is finished.

Figure 7A:
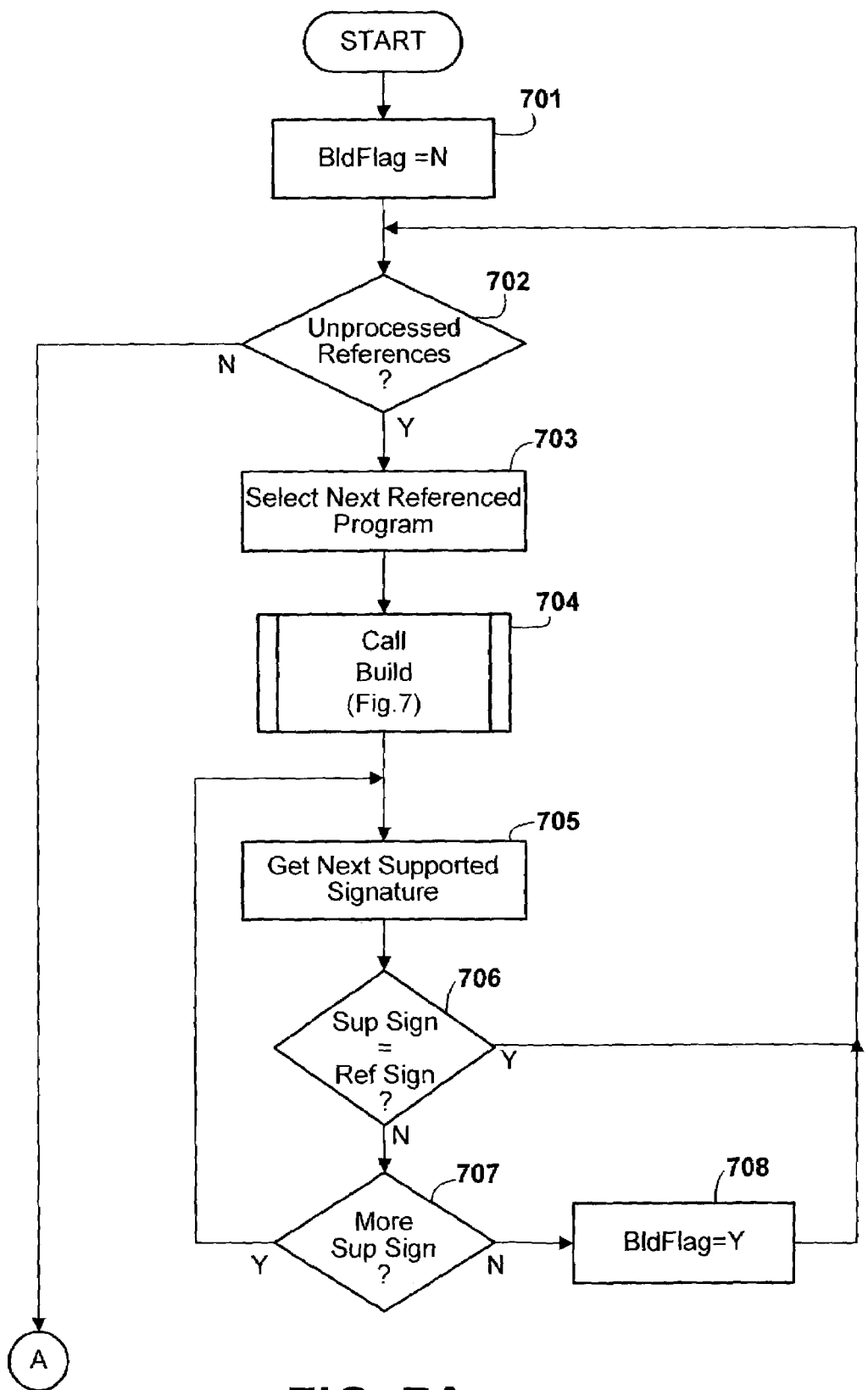
FIGS. 7A and 7B (herein referred to collectively as FIG. 7) are a high-level flow diagram of a recursive Build procedure used in building an application, according to the preferred embodiment.
Figure 7B:
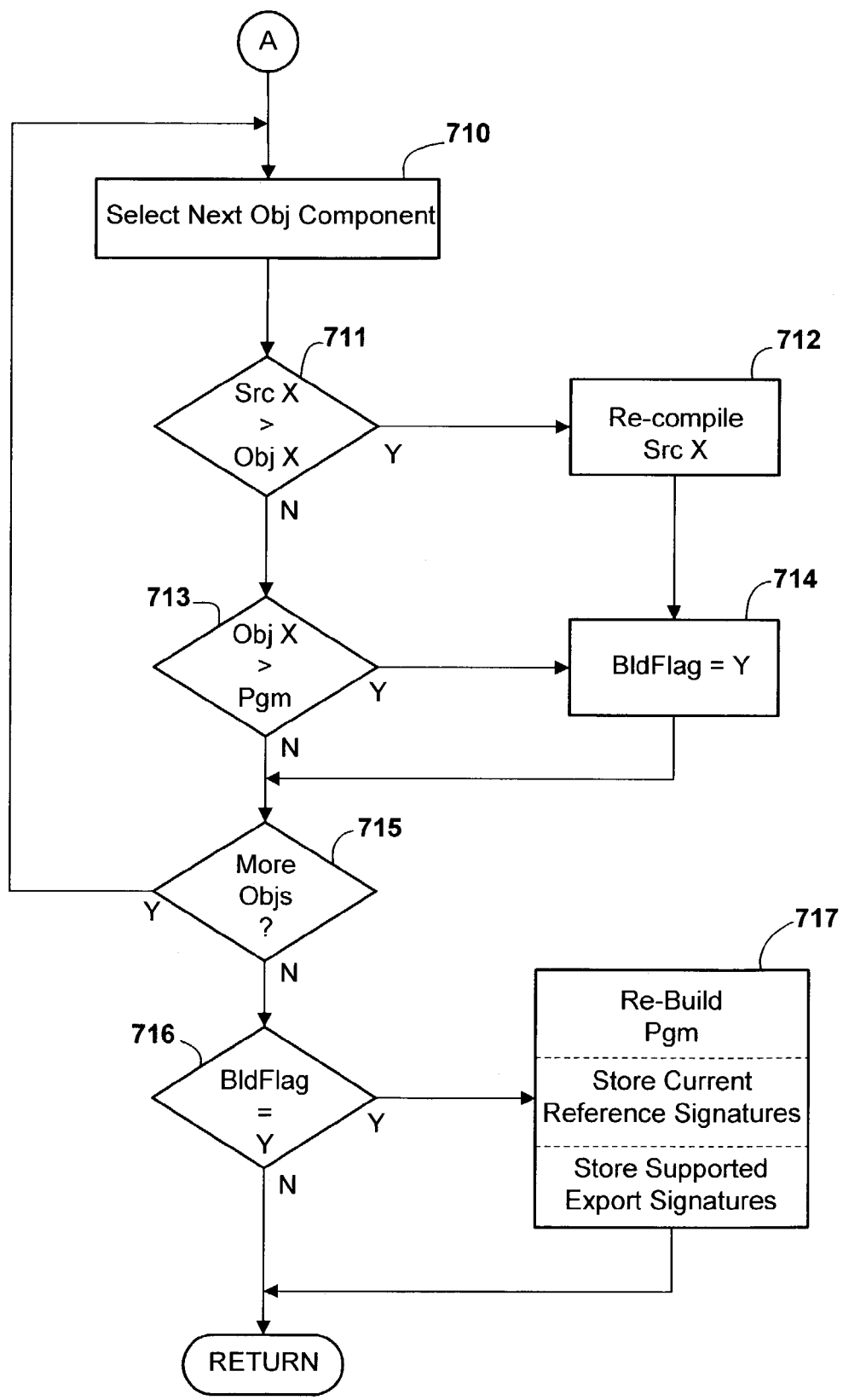

FIGS. 7A and 7B (herein referred to collectively as FIG. 7) are a high-level flow diagram showing the recursive Build procedure used by build utility program 204 to process a program listed in make file 241, according to the preferred embodiment. The same generalized procedure may be used for an application program or a service program, although typically not all branches or steps will be executed. Referring to FIG. 7, the build utility initially resets a build flag (BldFlag) corresponding to the selected program for which the Build procedure was called (step 701). The build flag is used to help determine whether the selected program needs to be built.

The build utility then processes any referenced programs or "dependencies" before further attempting to build the selected program. If there are any unprocessed referenced programs, the "Y" branch is taken from step 702. When all references have been process, the "N" branch is taken from step 702 to continue at step 710. A referenced program is a program which was linked or bound by reference in the selected program (i.e., a reference 302,303 to it was included in the selected program). In the exemplary embodiment explained and illustrated herein, service programs are bound by reference and application programs are not. However, it should be understood that, depending on the programming environment, there could be a more complex hierarchy of references. For example, one service program might be bound by reference to another service program, which is in turn bound by reference to an application program. Alternatively, an application program might be bound by reference to another application program. The use of a recursive procedure as explained herein traverses any such hierarchy to the lowest possible level, so that programs which do not reference any other programs are built first, and any program which does reference another program is not built until all the referenced programs are first built. For clarity of explanation and illustration herein, the referenced program will be assumed to be a service program, and the program which contains the reference an application program, although this need not be the case as explained above.

When the "Y" branch is taken from step 702 to process a referenced (service) program, the build utility selects the next referenced (service) program (step 703), and recursively calls the Build procedure to build the referenced (service) program (step 704) before proceeding further with the originally selected (application) program. Upon return from the Build procedure, any necessary steps required to recompile or rebuild the referenced (service) program have been performed (but it is possible that no such steps were in fact necessary, and none were performed). The build utility then examines the supported export signatures in the header 401 of the referenced (service) program. It retrieves the next supported signature (step 705) and compares this to the reference signature in the header 301 of the selected (application) program (step 706). If the two signatures are identical, then it is not necessary to examine any further reference signatures, and the "Y" branch is taken from step 706. If the signatures are not identical, the "N" branch is taken. In this case, if there are any more supported signatures to be examined from header 401 (step 707), the "Y" branch is taken to step 705, and the next supported signature is examined. If all supported signatures from the header 401 have been compared to the reference signature in the header 301 of the selected (application program) without finding a compare, then the "N" branch is taken from step 707, and BldFlag is set to a "yes" value (step 708). In this case, because the selected (application) program was originally built referencing aversion of the referenced (service) program which is no longer supported or valid, it will be necessary to rebuild the selected (application) program.

After all references (if any) have been processed, the "N" branch is taken form step 702 to step 710. Note that in the case where the "selected program" for which the Build procedure was called is a service program as in the example of FIGS. 2-5., the "N" branch will be taken from step 702 immediately. The build utility then in turn selects each object component from the list of object components of the selected program in make file 241 (step 710). The timestamp of the selected object module component is compared to the timestamp of the source filed corresponding to the selected object component (step 711). If the timestamp of the source file is later than that of the object module, the "Y" branch is taken from step 711, and the source file is re-compiled (step 712). I.e., compiler 203 is called to compile the source file to produce a new version of the object module, which will necessarily have a timestamp later than the source file, and later than the selected program. The BidFlag is then set to "Y" (step 714).

If, at step 711, the timestamp of the source file is earlier than that of the object module, the "N" branch is taken, and the source file need not be recompiled. The build utility then compares the timestamp of the selected object module to the timestamp of the selected program containing it (step 713). If the timestamp of the object module is later than that of the program, the program must be re-built, so the "Y" branch is taken from step 713 and the BldFlag is set to "Y" (step 714).

If there are any more object modules in the list of object module components in make file 241 (step 715), the build utility selects the next such object module at step 710. If no more object module components remain, the "Y" branch is taken from step 715.

If any of the previously executed steps have caused the BldFlag to be set to "Y"; then the "Y" branch is taken from step 716 and the selected program is rebuilt (step 717). If the BldFlag is still set to "N", it is not necessary to rebuild the selected program, and step 717 is by-passed. The Build procedure then returns.

At step 717, the program is rebuilt by copying all included object modules, incorporating necessary references, constructing a header, and any other necessary steps according to the applicable programming environment. In particular, if the program being rebuilt (such as an application program) references another program (such as a service program), the current export signature of the referenced program is included in the header of the program being rebuilt, for use in future determinations whether or not to rebuild. If the program being rebuilt (such as a service program) is bound by reference in other programs (such as an application program), then a list of supported valid export signatures is included in the header of the program being rebuilt. In the preferred embodiment, the programmer specifies the list of valid supported versions of the service program, from which supported export signatures are derived. It may alternatively be possible to construct such a list algorithmically, but the decisions required are very complex, and an algorithmic solution is therefore likely to be conservative. I.e., in order to prevent incompatibilities, the algorithm would probably exclude from the list of supported versions at least some versions which are not in fact incompatible.

In general, the routines executed to implement the illustrated embodiments of the invention, whether implemented as part of an operating system or a specific application, program, object, module or sequence of instructions, are referred to herein as "programs" or "computer programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, magnetic tape, and transmission-type media such as digital and analog communications links, including wireless communications links. An example of signal-bearing media is illustrated in FIG. 1 as system memory 102, and as data storage devices 125-127.

As used herein, the terms "linking" and "binding" have been used interchangeably to designate as technique whereby a reference is placed in one program at build time to another program, enabling the first program to invoke one or more procedures within the second. In some programming environments, these terms have specific, distinct meanings. As used herein, no such distinction is made, and what is described as "binding" could include "linking".

Although a specific embodiment of the invention has been disclosed along with certain alternatives, it will be recognized by those skilled in the art that additional variations in form and detail may be made within the scope of the following claims:

What is claimed is:

1. A method for building computer software, comprising the steps of:
   executing a first build process, said first build process binding an application program to a program library and recording a first signature of said program library at the time of said binding step in the header of said application program, wherein said first signature uniquely identifies a version of said program library;
   subsequently executing a second build process, said second build process:
   (a) automatically comparing said first signature with a plurality of supported signatures of said program library, each of said plurality of supported signatures corresponding to a different respective supported version of said program library, wherein the plurality of supported signatures include the current signature and one or more additional supported signatures from previously built versions of said program library, each said signature is a hash function of said program library's externally accessible procedure names for the different respective supported version of said program library, and the plurality of supported signatures are listed in the header of said program library;
   (b) automatically determining whether to re-build said application program based on results of said automatically comparing step, said automatically determining step determining to re-build said application program if said first signature does not match any of said plurality of supported signatures of said program library; and
   (c) automatically re-building said application program responsive to a determination made by said automatically determining step.

2. The method for building computer software of claim 1, wherein said first build process binds a plurality of application programs to said program library, and records said first signature in each of said plurality of application programs.

3. The method for building computer software of claim 1, wherein said first build process binds said application program to a plurality of program libraries, and records a respective signature of each of said program libraries at the time of said binding step in said application program.

4. The method for building computer software of claim 1, wherein said application program comprises a first set of compiled object modules, each compiled object module of said first set being compiled from a respective corresponding source module, and wherein said second build process further comprises:
  automatically comparing a respective compilation timestamp associated with each compiled object module of said first set with a respective timestamp associated with each respective corresponding source module; and
  with respect to any compiled object module having a timestamp preceding the timestamp of its corresponding source module, automatically re-compiling the compiled object module from its corresponding source module.

5. The method for building computer software of claim 4, wherein said program library comprises a second set of compiled object modules, each compiled object module of said second set being compiled from a respective corresponding source module, and wherein said second build process further comprises:
  automatically comparing a respective compilation timestamp associated with each compiled object module of said second set with a respective timestamp associated with each respective corresponding source module; and
  with respect to any compiled object module having a timestamp preceding the timestamp of its corresponding source module, automatically re-compiling the compiled object module from its corresponding source module.

6. The method for building computer software of claim 5, wherein said program library further references a second program library, and wherein said second build process further comprises the step of automatically recursively rebuilding said program library using steps (a) and (b).

7. A computer program product for building computer software, comprising:
  a plurality of executable instructions recorded on a recordable-type medium, wherein said instructions, when executed by at least one processor of a digital computing device, cause the device to perform the steps of:
  executing a first build process, said first build process binding an application program to a program library and recording a first signature of said program library at the time of said binding step in the header of said application program, wherein said first signature uniquely identifies a version of said program library;
  subsequently executing a second build process, said second build process:
  (a) automatically comparing said first signature with a plurality of supported signatures of said program library, each of said plurality of supported signatures corresponding to a different respective supported version of said program library, wherein the plurality of supported signatures include the current signature and one or more additional supported signatures from previously built versions of said program library, each said signature is a hash function of said program library's externally accessible procedure names for the different respective supported version of said program library, and the plurality of supported signatures are listed in the header of said program library;
  (b) automatically determining whether to re-build said application program based on results of said automatically comparing step, said automatically determining step determining to re-build said application program if said first signature does not match any of said plurality of supported signatures of said program library; and
  (c) automatically re-building said application program responsive to a determination made by said automatically determining step.

8. The computer program product for building computer software of claim 7,
  wherein said first build process binds a plurality of application programs to said program library, and records said first signature in each of said plurality of application programs.

9. The computer program product for building computer software of claim 7,
  wherein said first build process binds said application program to a plurality of program libraries, and records a respective signature of each of said program libraries at the time of said binding step in said application program.

10. The computer program product for building computer software of claim 7, wherein said application program comprises a first set of compiled object modules, each compiled object module of said first set being compiled from a respective corresponding source module, and wherein said second build process further comprises:
  automatically comparing a respective compilation timestamp associated with each compiled object module of said first set with a respective timestamp associated with each respective corresponding source module; and
  with respect to any compiled object module having a timestamp preceding the timestamp of its corresponding source module, automatically re-compiling the compiled object module from its corresponding source module.

11. The computer program product for building computer software of claim 10, wherein said program library comprises a second set of compiled object modules, each compiled object module of said second set being compiled from a respective corresponding source module, and wherein said second build process further comprises:
  automatically comparing a respective compilation timestamp associated with each compiled object module of said second set with a respective timestamp associated with each respective corresponding source module; and
  with respect to any compiled object module having a timestamp preceding the timestamp of its corresponding source module, automatically re-compiling the compiled object module from its corresponding source module.

12. The computer program product for building computer software of claim 11, wherein said program library further references a second program library, and wherein said second build process further comprises the step of automatically recursively rebuilding said program library using steps (a) and (b).

\* \* \* \* \*